US011200289B2

(12) United States Patent
Kartoun et al.

(10) Patent No.: US 11,200,289 B2
(45) Date of Patent: Dec. 14, 2021

(54) CENTRALIZED DATA SHARING PROGRAM

(71) Applicant: INTERNATIONAL BUSINESS MACHINES CORPORATION, Armonk, NY (US)

(72) Inventors: Uri Kartoun, Cambridge, MA (US); XiaoJing Liu, Qingdao (CN); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 15/968,817

(22) Filed: May 2, 2018

(65) Prior Publication Data

US 2019/0340299 A1 Nov. 7, 2019

(51) Int. Cl.
*G06F 16/9535* (2019.01)
*H04L 29/08* (2006.01)
*G06F 16/2457* (2019.01)

(52) U.S. Cl.
CPC .... *G06F 16/9535* (2019.01); *G06F 16/24575* (2019.01); *H04L 67/306* (2013.01); *H04L 67/22* (2013.01)

(58) Field of Classification Search
CPC .............. G06F 16/9535; G06F 16/24575
USPC .............................................. 707/755
See application file for complete search history.

(56) References Cited

U.S. PATENT DOCUMENTS 5,775,404 A * 7/1998 Miki .................. B22D 11/16
164/477
7,469,292 B2 * 12/2008 Landsman ......... G06Q 10/107
709/207
8,085,796 B2    12/2011 Kreiner et al.
8,429,220 B2 *  4/2013 Wilkinson ......... H04L 67/2838
709/202
8,521,767 B2 *  8/2013 Robbins ............ G06Q 10/10
707/769
8,578,009 B1 * 11/2013 Newstadt .......... H04L 61/1594
709/223

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Tony Mahmoudi
*Assistant Examiner* — Michael Le
(74) *Attorney, Agent, or Firm* — Elliot J. Shine

(57) ABSTRACT

The method, computer program product, and computer system of the present invention may include a computing device which may identify contacts of a first user from a data communication channel and create a contact profile for each of the identified contacts in a universal data sharing panel. The contact profiles may contain contact information for each of the identified contacts, the contact information may be extracted from the data communication channel. The computing device may map the data communication channel associated with each of the identified contacts to a corresponding contact profile in the universal data sharing panel according to a set of data sharing rules. The computing device may receive data to be sent to a second user. The computing device may send the data to the second computing device of the second user using the universal data sharing panel in accordance with the set of data sharing rules.

12 Claims, 8 Drawing Sheets

(56) References Cited

U.S. PATENT DOCUMENTS

| | | | |
|---|---|---|---|
| 8,613,070 B1* | 12/2013 | Borzycki | H04L 67/10 726/8 |
| 8,745,139 B2 | 6/2014 | Demarta et al. | |
| 8,775,947 B2 | 7/2014 | Martinez et al. | |
| 8,843,567 B2* | 9/2014 | Karnik | H04L 51/32 709/206 |
| 8,997,006 B2 | 3/2015 | Whitnah et al. | |
| 9,313,210 B2* | 4/2016 | Coletrane | G06Q 50/01 |
| 9,479,541 B2 | 10/2016 | Singh et al. | |
| 9,756,027 B2* | 9/2017 | Li | H04L 63/08 |
| 2002/0059201 A1* | 5/2002 | Work | G06Q 10/10 |
| 2005/0075925 A1* | 4/2005 | Sash | G06Q 30/0236 705/14.36 |
| 2005/0198299 A1* | 9/2005 | Beck | H04L 67/00 709/226 |
| 2006/0135142 A1* | 6/2006 | Repka | H04M 3/4931 455/418 |
| 2007/0098145 A1* | 5/2007 | Kirkland | G10L 15/26 379/201.01 |
| 2008/0090597 A1* | 4/2008 | Celik | H04M 1/72552 455/466 |
| 2010/0024020 A1* | 1/2010 | Baugher | G06F 21/6245 726/7 |
| 2010/0082751 A1* | 4/2010 | Meijer | G06F 15/16 709/206 |
| 2011/0151850 A1* | 6/2011 | Haaparanta | H04M 1/2745 455/415 |
| 2011/0258275 A1* | 10/2011 | Rao | H04L 51/32 709/206 |
| 2011/0276396 A1* | 11/2011 | Rathod | H04L 51/066 705/14.49 |
| 2012/0063585 A1* | 3/2012 | Gravino | H04M 1/2757 379/218.01 |
| 2012/0099718 A1* | 4/2012 | Langos | G06Q 50/01 379/201.01 |
| 2012/0150888 A1* | 6/2012 | Hyatt | G06F 21/6254 707/758 |
| 2012/0278386 A1* | 11/2012 | Losacco | H04L 67/1078 709/204 |
| 2012/0304265 A1* | 11/2012 | Richter | H04L 63/102 726/7 |
| 2012/0311131 A1* | 12/2012 | Arrasvuori | H04L 63/102 709/224 |
| 2012/0311590 A1* | 12/2012 | Park | G06F 1/329 718/102 |
| 2013/0239009 A1 | 9/2013 | DeGrazia | |
| 2013/0276136 A1* | 10/2013 | Goodwin | G06Q 30/02 726/27 |
| 2014/0032691 A1* | 1/2014 | Barton | H04L 41/00 709/206 |
| 2014/0041048 A1* | 2/2014 | Goodwin | H04L 63/101 726/27 |
| 2014/0109205 A1* | 4/2014 | Lymer | G06Q 30/02 726/6 |
| 2014/0280152 A1* | 9/2014 | Jin | G06F 16/285 707/737 |
| 2014/0372485 A1* | 12/2014 | Crumrine | G06F 16/9535 707/784 |
| 2015/0100356 A1* | 4/2015 | Bessler | G06Q 30/01 705/7.12 |
| 2015/0186406 A1* | 7/2015 | Nadimi | G06Q 50/01 707/610 |
| 2015/0234939 A1* | 8/2015 | Aharony | G06F 16/9537 707/737 |
| 2015/0302218 A1* | 10/2015 | Fielder | G06F 21/6209 713/193 |
| 2015/0312759 A1* | 10/2015 | Kim | H04L 9/085 455/411 |
| 2015/0319144 A1* | 11/2015 | Barton | G06F 9/485 713/168 |
| 2017/0289076 A1* | 10/2017 | Rife | H04L 67/20 |

* cited by examiner

CENTRALIZED DATA SHARING PROGRAM

BACKGROUND

The present invention relates generally to a method, system, and computer program for single-channel cognitive data sharing. More particularly, the present invention relates to a method, system, and computer program for cognitive data sharing using a single-channel universal data sharing application.

Digital transfer of data using computers and other personal devices has become the primary means of information sharing in the modern age. The transfer and sharing of digital information between computing devices has been facilitated with the creation of multiple data sharing technologies, such as data sharing websites, social media, email, and various other messaging applications. While such digital transfer and sharing of information has become easier with the advent of such data sharing technologies, many users end up having multiple data sharing applications and programs. Thus, users need to have multiple applications running on their computers and personal devices, with each having different login credentials. Further, each data sharing application has their own unique interface which may, for example, be located on the web, on a software program, or on a mobile phone application. Thus, a more efficient way of accessing and utilizing various data sharing applications and programs is needed.

BRIEF SUMMARY

An embodiment of the invention may include a method, computer program product and computer system for data sharing between multiple computers communicating via a communications network. The method, computer program product, and computer system may include a computing device which may identify contacts of a first user from a data communication channel. The computing device may create a contact profile for each of the identified contacts in a universal data sharing panel. The contact profiles may contain contact information for each of the identified contacts. Further, the contact information, at least in part, may be extracted from the data communication channel. The computing device may map the data communication channel associated with each of the identified contacts to a corresponding contact profile, respectively, in the universal data sharing panel according to a set of data sharing rules. The computing device may receive data to be sent to a second user associated with at least one of the contact profiles of the first user. The second user may use a second computing device which communicates with the first computing device via a communications network. The computing device may send the data to the second computing device of the second user using the universal data sharing panel in accordance with the set of data sharing rules.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
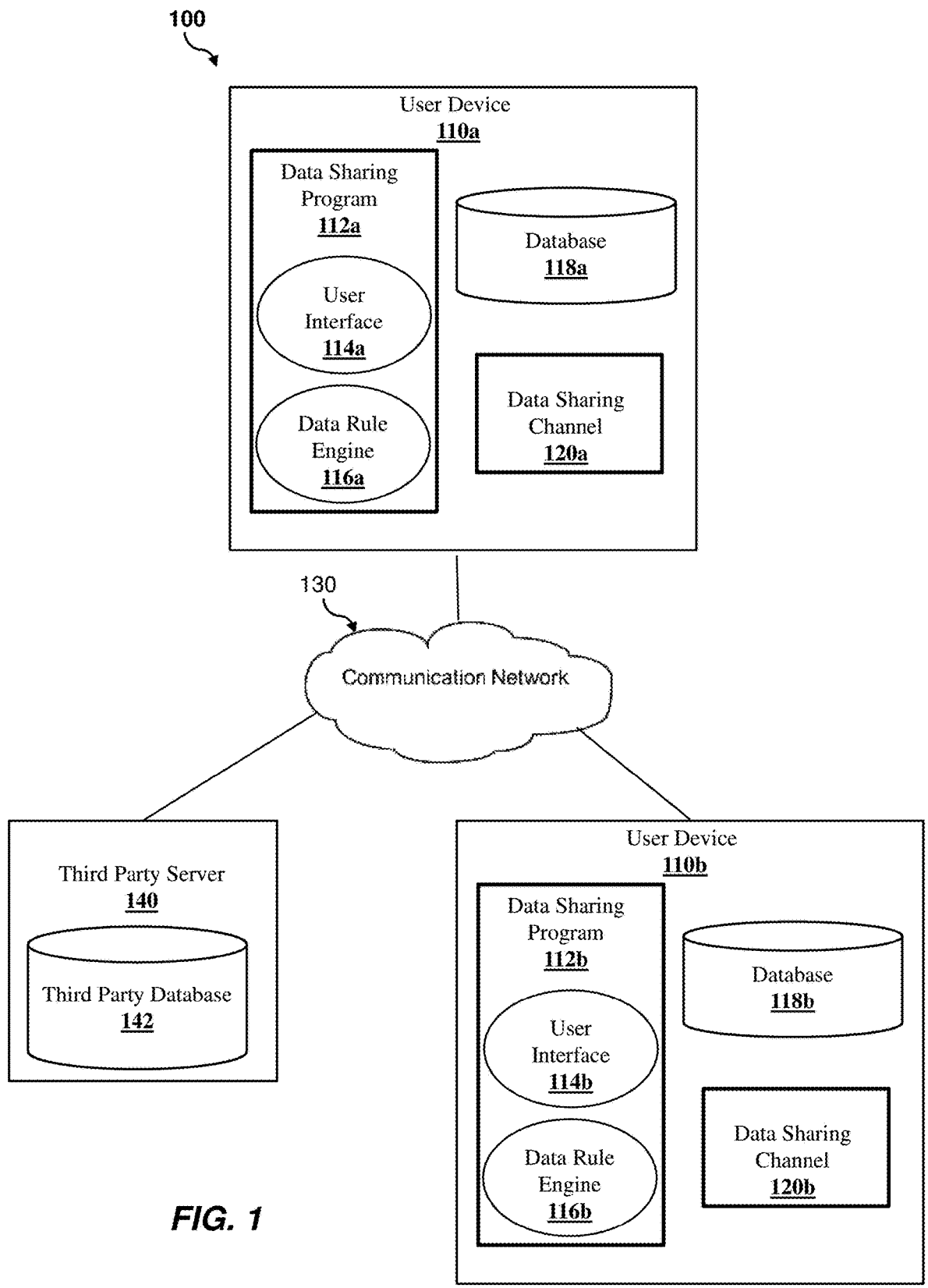
FIG. 1 is a block diagram which illustrates a system for a cognitive data sharing, in accordance with an embodiment of the invention.

FIG. 1 illustrates a cognitive data sharing system 100, in accordance with an embodiment of the invention. In an example embodiment, cognitive data sharing system 100 includes user devices 110 and a third-party server 140 interconnected via a communications network 130.

In the example embodiment, the network 130 is the Internet, representing a worldwide collection of networks and gateways to support communications between devices connected to the Internet. The network 130 may include, for example, wired, wireless or fiber optic connections. In other embodiments, the network 130 may be implemented as an intranet, a local area network (LAN), or a wide area network (WAN). In general, the network 130 can be any combination of connections and protocols that will support communications between user devices the 110 and the third-party server 140.

The user devices 110 may include a data sharing program 112, a database 118, and a data sharing channel 120. The user devices 110 may be a desktop computer, a notebook, a laptop computer, a tablet computer, a handheld device, a smart-phone, a cellular phone, a landline phone, a thin client, or any other electronic device, computing system, wired or wireless device capable of receiving and sending content to and from other computing devices, such as the user devices 110 and the third-party sever 140 via the network 130. The cognitive data sharing system 100 may include one or more user devices 110, for example, a user device 110a and a user device 110b. While only two user devices 110a-b are illustrated, it can be appreciated that the cognitive data sharing system 100 may have any number of user devices 110. Further, the cognitive data sharing system 100 may include one or more third-party servers 140. The user device 110 is described in more detail with reference to FIG. 7.

The data sharing program 112 may include a user interface 114 and a data rule engine 116. The data sharing program 112 is a program capable of transferring digital files between the user devices 110 over the network 130. Digital files may include but are not limited to, audio, visual and textual content. For example, the data sharing program 112 may transfer a digital file from the user device 110a to the user device 110b. The digital files may be located on any suitable file storage system such as, but not limited to, a hard drive, cloud storage, and a remote server, etc. For example, digital files may be stored on the database 118. The data sharing program 112 may also monitor a user's activity on the user device 110 and collect the contact information for the contacts of the user. For example, data sharing program may monitor a user's interaction with the data sharing channel 120. Contact information may include, but is not limited to, email addresses, IP addresses, social media accounts, file transfer accounts, phone numbers, and messaging accounts, etc. Contact information may be stored, for example, on the database 118. For example, data sharing program may monitor a user's interaction with the data sharing channel 120 and collect the contact information for contacts associated with the data sharing channel 120. Further, the data sharing program 112 may identify user contacts on multiple data sharing channels 120 and aggregate the multiple data sharing channels 120 into a single data sharing channel on the user interface 114. While the data sharing program 112 is illustrated as being resident on the user devices 110, it can be appreciated that the data sharing program 112 may be located on any suitable computing device such as, but not limited to third-party server 140.

The user interface 114 includes components used to receive input from a user on the user device 110 and transmit the input to another user device and display the information to the user on the user device 110 via a single data sharing channel. In an example embodiment, the user interface 114 uses a combination of technologies and devices, such as device drivers, to provide a platform to enable users of the user device 110 to interact with the data sharing program 112. In the example embodiment, the user interface 114 receives input, such as but not limited to, textual, visual, or audio files from a user of the device 110. In an example embodiment, the user interface 114 may be located on the desktop of the user device 110. Further, the user interface 114 may include profiles of a user's contacts. For example, the user interface 114 may include profile photos of a user's contacts which are embedded with that contact's information. In an example embodiment, a user of the device 110a may drag a digital file located on the user device 110a and drop the file on a profile photo of a contact associated with the user device 110b located on the user interface 114. the user interface 114 is described in more detail with reference to FIGS. 6a-b.

The data rule engine 116 contains the rules according to which the data sharing program 112 transfers digital files between the user devices 110. For example, the data rule engine 116 may have specific rules to govern the transfer of confidential digital files such as, but not limited to, the data rule engine 116 may only transfer a confidential digital file to a network dive within a firewall or the user's work email. If a digital file is not confidential, the data rule engine 116 may transfer the digital file to any data sharing channel 120 or user device 110 connected to the network 130. Also, the data rule engine 116 may create a priority list of all the data sharing channels 120 and/or the user devices 110 defining which of the data sharing channels 120 or user device 110 to send the digital file to. Further, the data rule engine 116 may have rules that govern the transfer of digital files based on the availability of a user contact. For example, the data rule engine 116 may determine which user device 110 a user contact is currently using and transfer the digital file to that active user device 110. Also, if a user contact is determined not to be active, the data rule engine 116 may cause the data sharing program 112 to put a hold on the transfer of the digital file until the user contact is active. In addition, the data rule engine 116 may also cause the data sharing program 112 to transfer the digital file to a secondary user device 110, a data sharing channel 120, and/or a third-party server 140. In another embodiment, the data rule engine 116 may also have rule that govern the transfer of digital files based on the detected mood of a user contact. For example, the data rule engine 116 may utilize an application programming interface (API), such as, but not limited to, IBM Watson®, to detect a user contact's mood (IBM WATSON is a registered trademark of International Business Machines, Corp.). If, for example, a user contact is determined to be in a bad mood, the data rule engine 116 may cause the data sharing program 112 to put a hold on the transfer of the digital file until the user contact is determined to be in a good mood.

The data sharing program 112 may also interact with the data sharing channel 120 to obtain digital files and/or contact data. The data sharing channel 120 may be any computer application capable of storing files and/or facilitating communication between users such as, but not limited to, text messaging applications, file sharing applications, social media application, email applications, and instant messaging applications, etc. For example, the data sharing channel 120 may be a user's Dropbox® account and the data sharing program 112 may obtain all the user's contacts and files stored within the user's Dropbox® account (DROPBOX is a registered trademark of Dropbox, Inc.). Digital files and contact data associated with the data sharing channel 120 may be stored on the user device 110. In another embodiment, digital files and contact data associated with the data sharing channel 120 may be stored on the third-party database 142 on the third-party server 140. While only a single data sharing channel 120 is illustrated, it can be appreciated that the user device 110 may include multiple data sharing channels.

the third-party server 140 may include a third-party database 142. In the example embodiment, the third-party server 140 may be a desktop computer, a notebook, a laptop computer, a tablet computer, a thin client, or any other electronic device or computing system capable of storing compiling and organizing audio, visual, or textual content and receiving and sending that content to and from other computing devices, such as the user device 110. For example, the third-party server 140 may be a remote server having the third-party database 142 of the data sharing channel 120 where all information from the data sharing channel 120 is stored. Continuing with the above example, data sharing channel 120 may be, for example, Facebook®, and the third-party server 140 having the third-party database 142 may be Facebook's® server and database (FACEBOOK is the registered trademark of Facebook, Inc.).

Figure 2:
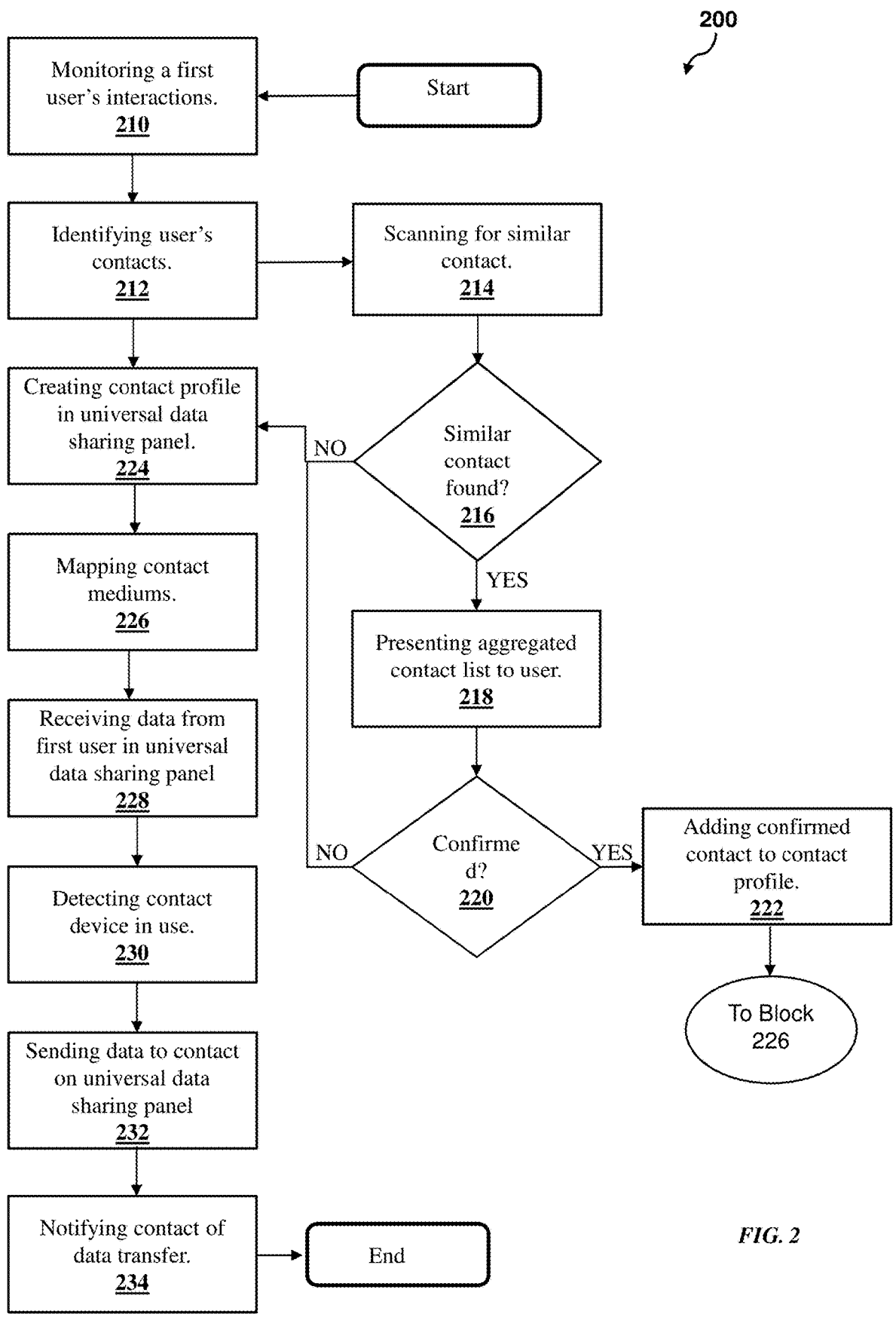
FIG. 2 is a flowchart illustrating a method of cognitive data sharing, in accordance with an embodiment of the invention.

Referring to FIG. 2, a method 200 for cognitive data sharing according to an embodiment of the present invention is described.

Referring to block 210, the data sharing program 112 monitors a user's interactions on the user device 110. Data sharing program may monitor user interactions with the database 118 and/or the data sharing channel 120 on the user device 110. For example, the data sharing program 112 may monitor a user's interactions with the user device 110 such as, but not limited to, user interactions with the database 118, the data sharing channel 120, and the third-party server 140.

Referring to block 212, the data sharing program 112 identifies a user's contacts based on the monitored user interactions. For example, if a user of the user device 110 checks the data sharing channel 120, such as an email application, the data sharing program 112 may identify all contacts which the user sends or has sent email to or receives or has received email from. Further, continuing with the example above, the data sharing program 112 may identify all contacts stored in a user's address book. In yet another example, a user may interact with another data sharing channel 120, such as a social media application, and the data sharing program 112 may identify all a user's contacts associated with the social media application.

It can be appreciated that a single contact may be identified on multiple mediums. Thus, the data sharing program 112 may proceed through blocks 214-222 or it may proceed directly to block 224 from block 212.

Referring to block 214, the data sharing program 112 scans all identified user contacts at block 214. If a similar user contact is found at block 216, the data sharing program 112 may present an aggregated list of identified contacts to a user to confirm if the contact information collected is for the same user contact at block 218. If a user indicates at block 220 that the contact information belongs to an already identified user contact, the data sharing program 112 may add the additional user contact information the identified contact profile at block 222. If the user indicates at block 220 that the contact information does not belong to an already identified user contact, data sharing program proceeds to block 224.

Referring to block 216, if the data sharing program 112 does not find a similar user contact, data sharing program proceeds to block 224.

Referring to block 224, the data sharing program 112 creates a contact profile for each identified contact on user interface 114. For example, the data sharing program 112 may create a contact profile for all a user's "friends" on Facebook® (FACEBOOK is a registered trademark of Facebook, Inc.). The contact profile may be a profile photo of the user contact, with all the user contact's contact information listed. The contact profile may be created on a data sharing panel on the user interface 114, which is described in more detail with reference to FIGS. 6a-b.

Referring to block 226, all the user devices 110, the databases 118, the data sharing channels 120, and the third-party servers 140 associated with each user contact profile and the user of the data sharing program 112 are mapped to a single data sharing channel. All the user devices 110, the databases 118, the data sharing channels 120, and the third-party servers 140 associated with each user contact profile may be mapped according to the rules of the data rule engine 116. Thus, multiple data sharing channels, such as the data sharing channels 120 and the third-party servers 140 are mapped to a single contact profile. Further, the login information for all data sharing channels detected by the data sharing program 112 at block 210 are also stored and mapped.

Referring to block 228, the data sharing program 112 receives a digital file from a user of the user device 110 to transfer to a selected user contact. In an example embodiment of the invention, a user of the user device 110 may select a digital file and drag and drop the selected digital file onto a user contact profile located on the user interface 114 of the data sharing program 112. The digital file may be stored on the user device 110, for example, in the database 118, or the digital file may be stored on the third-party server 140 associated with the data sharing channel 120. In another example embodiment of the invention, a user may utilize voice recognition capabilities and voice command controls resident on the user device 110 to select a digital file to send to a user contact through the data sharing program 112. For example, a user may say "send Susie the word document titled 'Patent Application 1234'." Further, a user may also attach a message to send with the selected digital file.

Referring to block 230, the data sharing program 112 detects which user device 110 the selected user contact is currently using.

Referring to block 232, the data sharing program 112 sends the digital file to the detected user device 110 currently in use by the selected user contact. The data sharing program 112 sends the digital file to the detected user device 110 currently in use by the selected user contact based on the rules defined in the data rule engine 116. For example, the data sharing program 112a on the user device 110a may send the digital file directly to the data sharing program 112b on the user contact's user device 110b. In another example, the data sharing program 112a on the user device 110a may send the digital file to the data sharing channel 120b on the user contact's user device 110b. In yet another example, the data sharing program 112a on the user device 110a may send the digital file directly to the data sharing program 112b and to the data sharing channel 120b on the user contact's user device 110b.

Referring to block 234, the data sharing program 112 notifies the user contact that they have received a digital file transfer. For example, the data sharing program 112 may display a notification on the user interface 114b of the data sharing program 112b located on the user device 110b of the user contact showing the receipt of a file transfer. The notification is described in more detail below with reference to FIGS. 6a-b.

Figure 3:
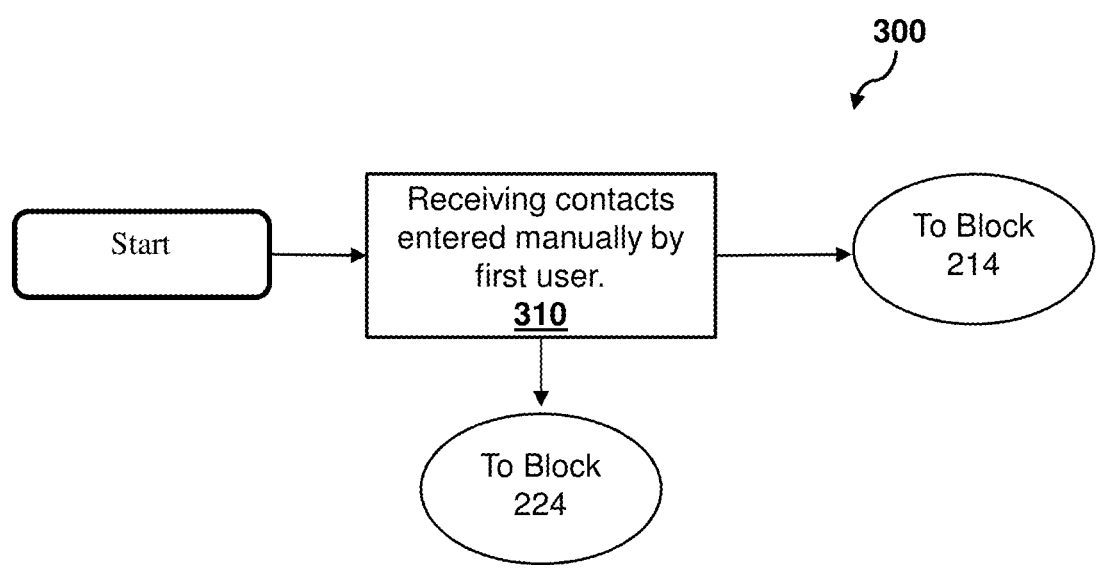
FIG. 3 is a flowchart illustrating a method of contact entry and verification, in accordance with an embodiment of the invention.

Referring to FIG. 3, another embodiment of a method 300 based on and using the cognitive data sharing system 100 is depicted. The method 300 shown in FIG. 3 is substantially similar to the method 200 of FIG. 2 with block 310 replacing blocks 210-212, which start the method shown in FIG. 2 and proceeding to either block 214 or block 224. The embodiment of FIG. 3 may be understood with reference to FIG. 2.

Referring to block 310, the data sharing program 112 receives user contact information manually from a user of the user device 110. For example, a user may manually enter a contact's email address into the data sharing program 112.

The data sharing program 112 will then proceed to either 214 or 224 as described in detail above.

Figure 4:
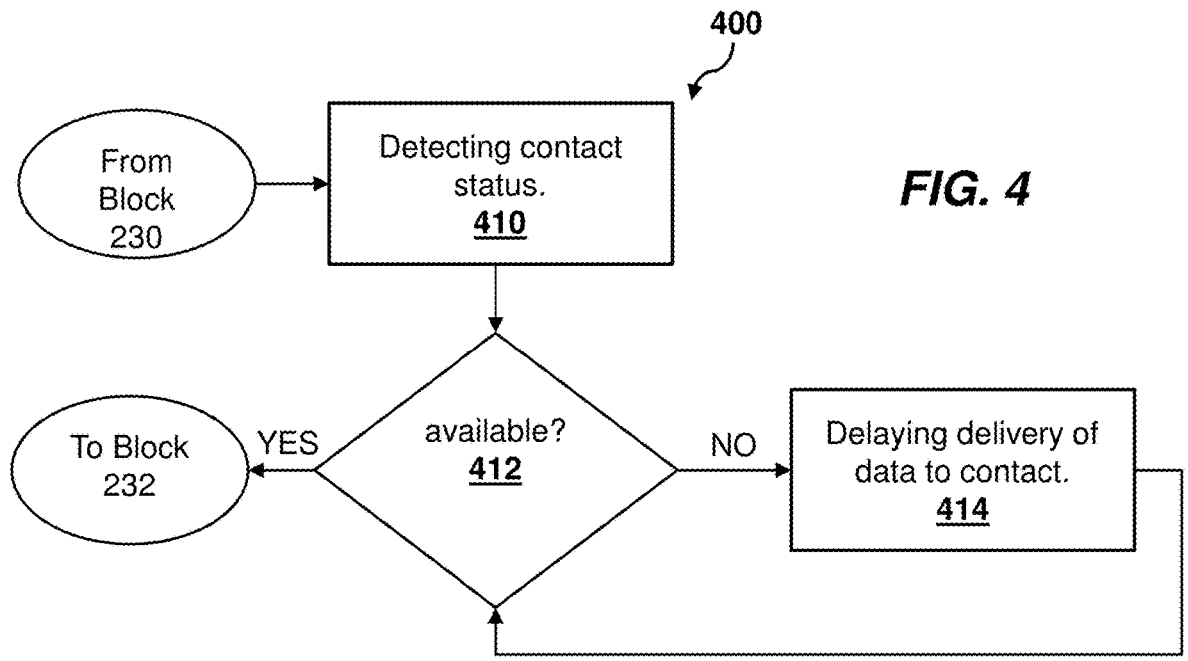
FIG. 4 is a flowchart illustrating a method of detecting contact status, in accordance with an embodiment of the invention.

Referring to FIG. 4, another embodiment of a method 400 based on and using the cognitive data sharing system 100 is depicted. The method 400 shown in FIG. 4 is substantially similar to the method 200 of FIG. 2 with blocks 410-414 added between block 230 and block 232. The embodiment of FIG. 4 may be understood with reference to FIG. 2.

Referring to block 410, after block 230, the data sharing program 112 may detect a user contact's activity status. If a user contact is determined to be available at block 412, the data sharing program 112 may proceed to block 232. For example, the data sharing program 112 may determine that the user device 110b is turned on and is active. If a user contact is determined to be busy at block 412, the data sharing program 112 may delay the delivery of the digital file. For example, the data sharing program 112 may determine that the user device 110b is turned off or has been idle for a threshold amount of time. The data sharing program 112 may repeat blocks 412-414 until the user contact is determined to be available and then proceed to block 232.

Figure 5:
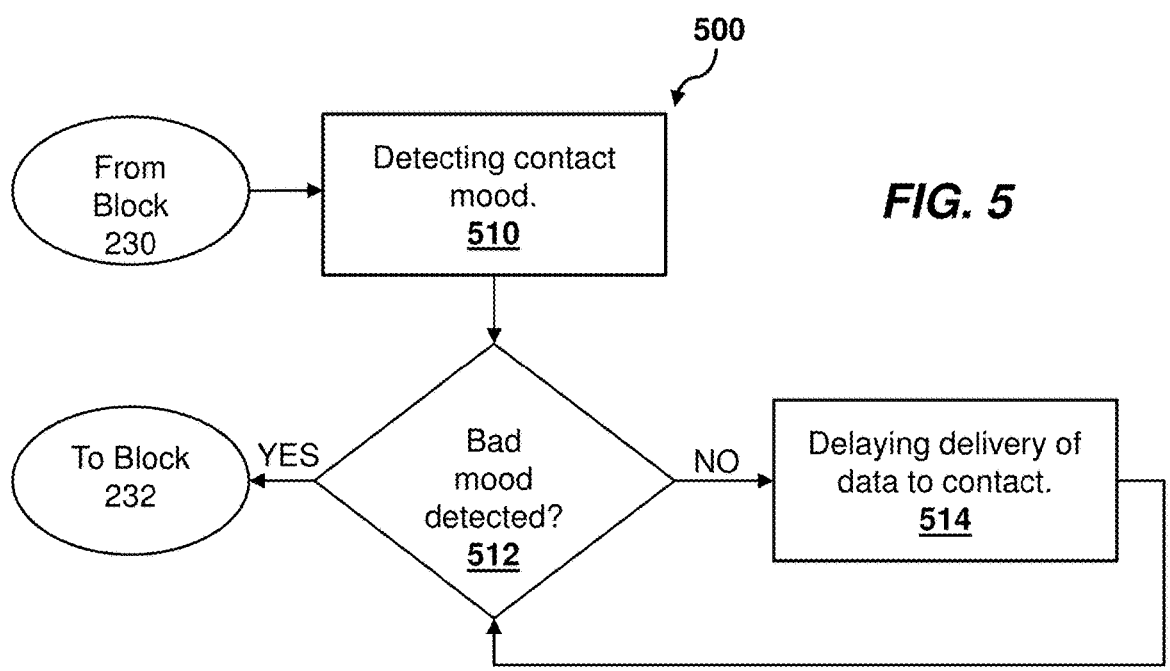
FIG. 5 is a flowchart illustrating a method of detecting contact mood, in accordance with an embodiment of the invention.

Referring to FIG. 5, another embodiment of a method 500 based on and using the cognitive data sharing system 100 is depicted. The method 500 shown in FIG. 5 is substantially similar to the method 200 of FIG. 2 with blocks 510-514 added between block 220 and block 222. The embodiment of FIG. 5 may be understood with reference to FIG. 2.

Referring to block 510, after block 230, the data sharing program 112 may detect a user contact's mood. If a user contact is determined to be in a good mood at block 512, the data sharing program 112 may proceed to block 232. For example, the data sharing program 112 may determine that the user contact is in a good mood using a mood determining API such as, but not limited to, IBM Watson®, which may analyze a user contact's activities on user device 110b (IBM WATSON is a registered trademark of International Business Machines, Corp.). If a user contact is determined to be in a bad mood at block 512, the data sharing program 112 may delay the delivery of the digital file. For example, the data sharing program 112 may determine that the user contact is in a bad mood using a mood determining API such as, but not limited to, IBM Watson®, which may analyze a user contact's activities on user device 110b (IBM WATSON is a registered trademark of International Business Machines, Corp.). The data sharing program 112 may repeat blocks 512-514 until the user contact is determined to be in a good mood and then proceed to block 232.

Figure 6A:
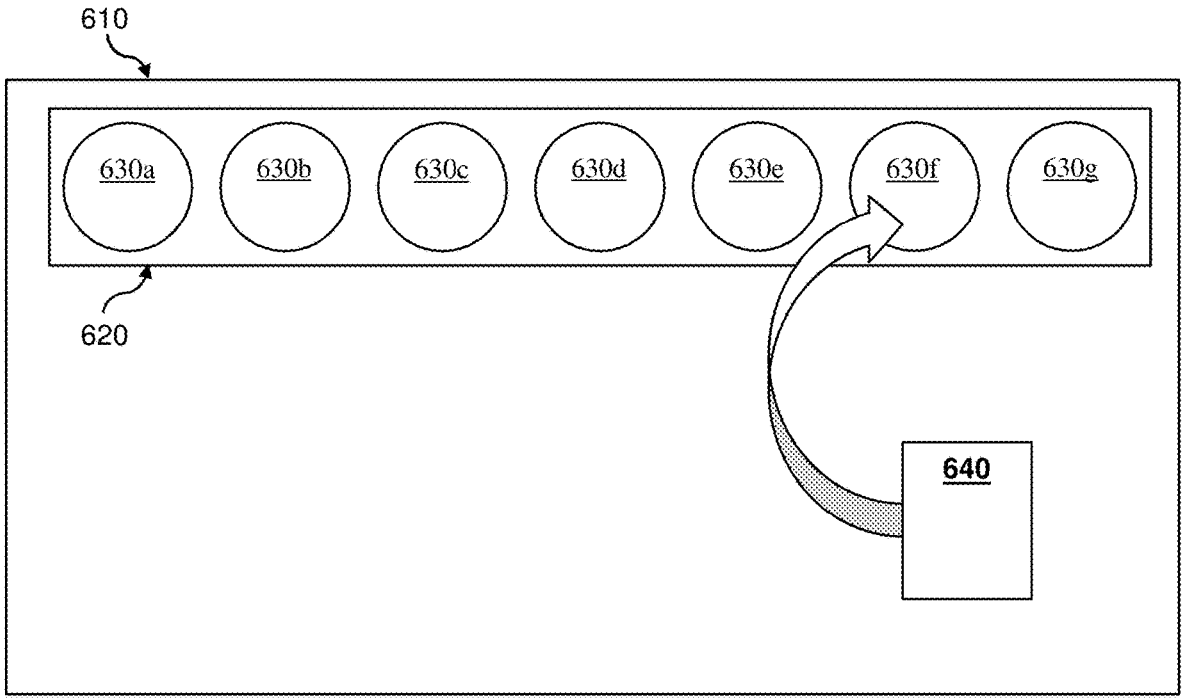
FIG. 6a is a block diagram illustrating an example user interface of the cognitive data sharing system of FIG. 1.
Figure 6B:
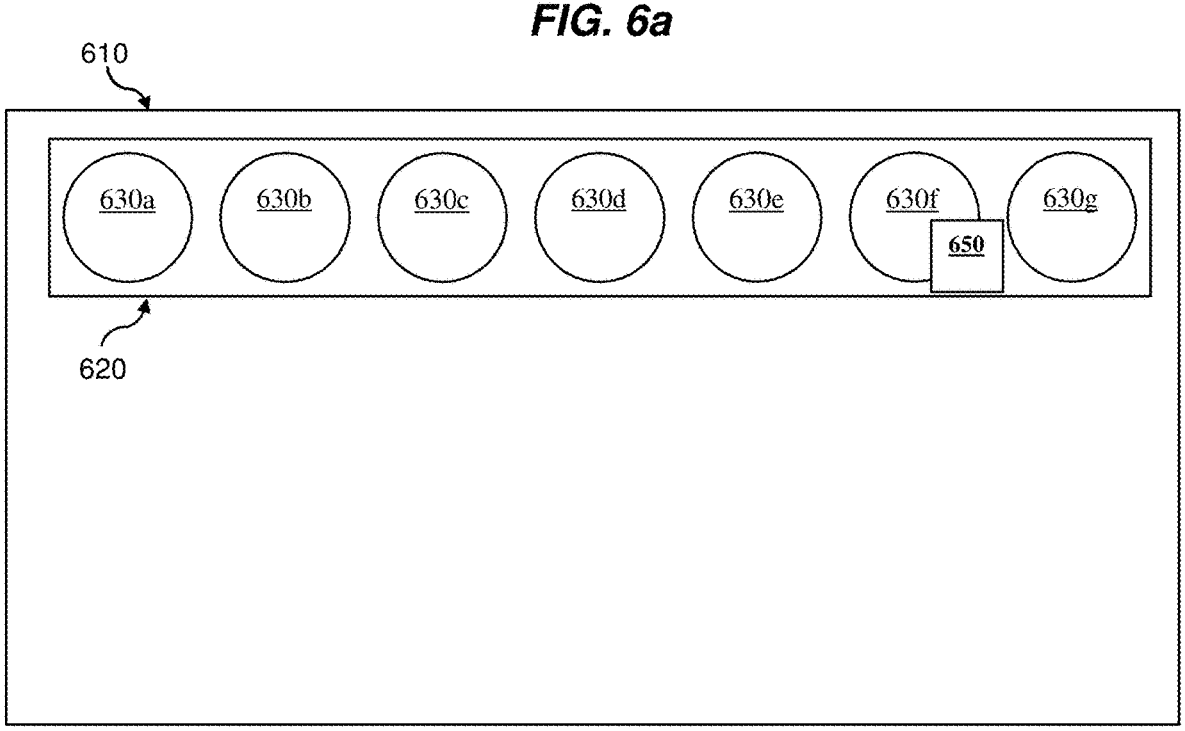
FIG. 6b is a block diagram illustrating an example user interface of the cognitive data sharing system of FIG. 1.

Referring to FIGS. 6a-b, a block diagram depicting an example user interface 114 of the data sharing program 112 is illustrated. FIG. 6a depicts the example user interface 114a on the user device 110a which is sending a digital file 640. FIG. 6b depicts the example a user interface 114b on the user device 110b which has received a digital file 640 from user device 110a.

The user interface 114 may have a data sharing panel 620 located on the desktop 610 of the user device 110. For example, the data sharing panel 620 may be a movable banner located on the desktop 610. The data sharing panel 620 may contain user contact profiles 630. The digital file 640 may be selected by a user and the dragged to one of the user contact profiles 630 as described in detail above for FIG. 2. If a user receives a file transfer through the data sharing program 112 as described above for FIG. 2, the notification 650 may be displayed on the data sharing panel 620 of the user interface 114. The notification 650 may, for example, display a number of un-opened file transfers. The notification 650 may be color coded to reflect the nature of the file transfer such as, but not limited to, urgency, confidentiality, user received from, file type, etc. The notification 650 may be permanently displayed on the data sharing panel 620 or may only appear when a file transfer has occurred. In another embodiment, the notification 650 may display as a pop-up box outside of the interface 114. For example, if a user has closed the user interface 114, but the data sharing program 112 is still running in the background and a file transfer is received, the notification 650 may pop-up on the desktop 610 of the user device 110.

Figure 7:
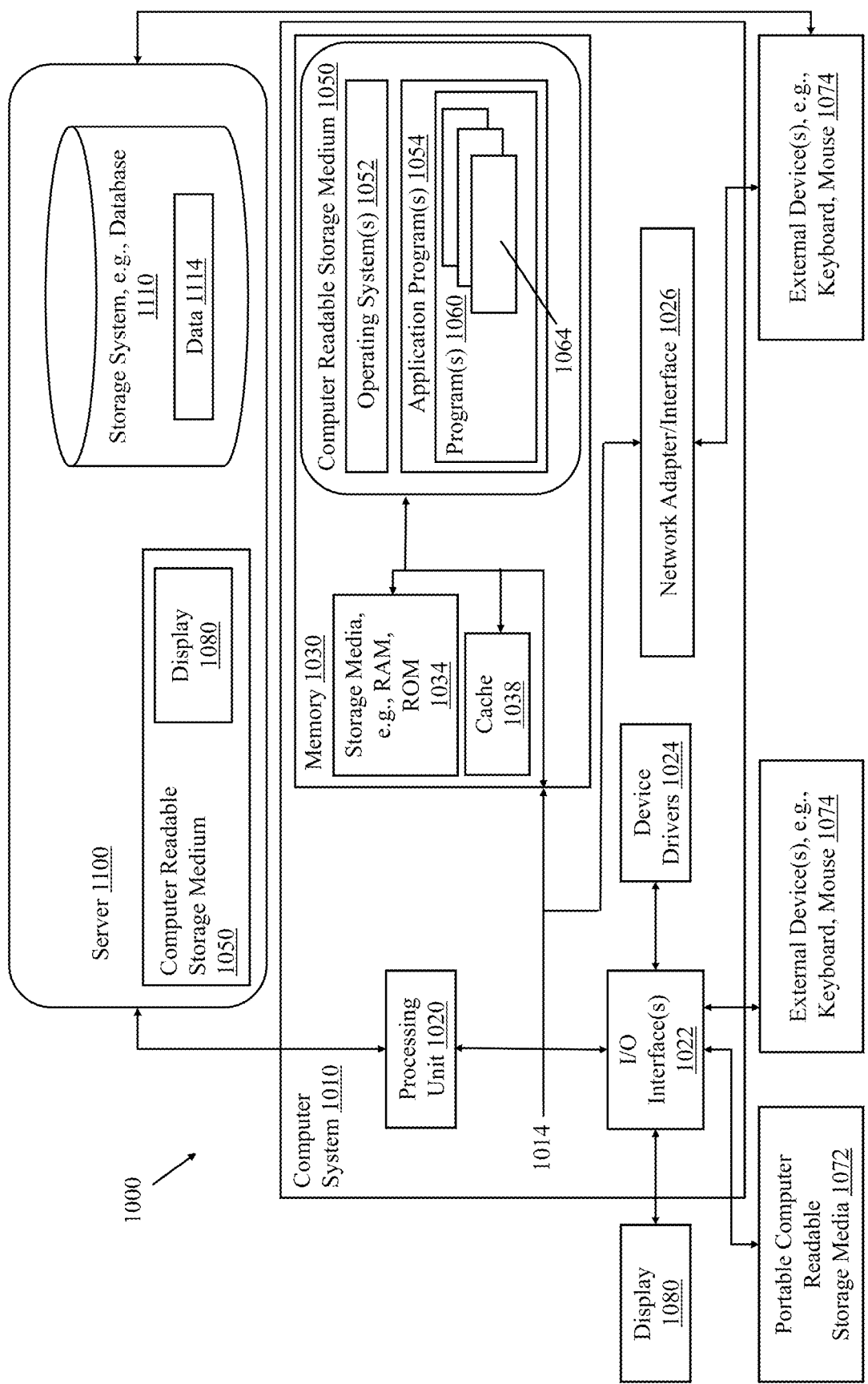
FIG. 7 is a block diagram depicting the hardware components of the cognitive data sharing system of FIG. 1, in accordance with an embodiment of the invention.

Referring to FIG. 7, a system 1000 includes a computer system or computer 1010 shown in the form of a generic computing device. The methods 200, 300, 400, and 500, for example, may be embodied in a program(s) 1060 (FIG. 7) embodied on a computer readable storage device, for example, generally referred to as memory 1030 and more specifically, computer readable storage medium 1050 as shown in FIG. 7. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 7 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 7 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 7, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200, 300, 400, and 500 (FIGS. 2-5), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
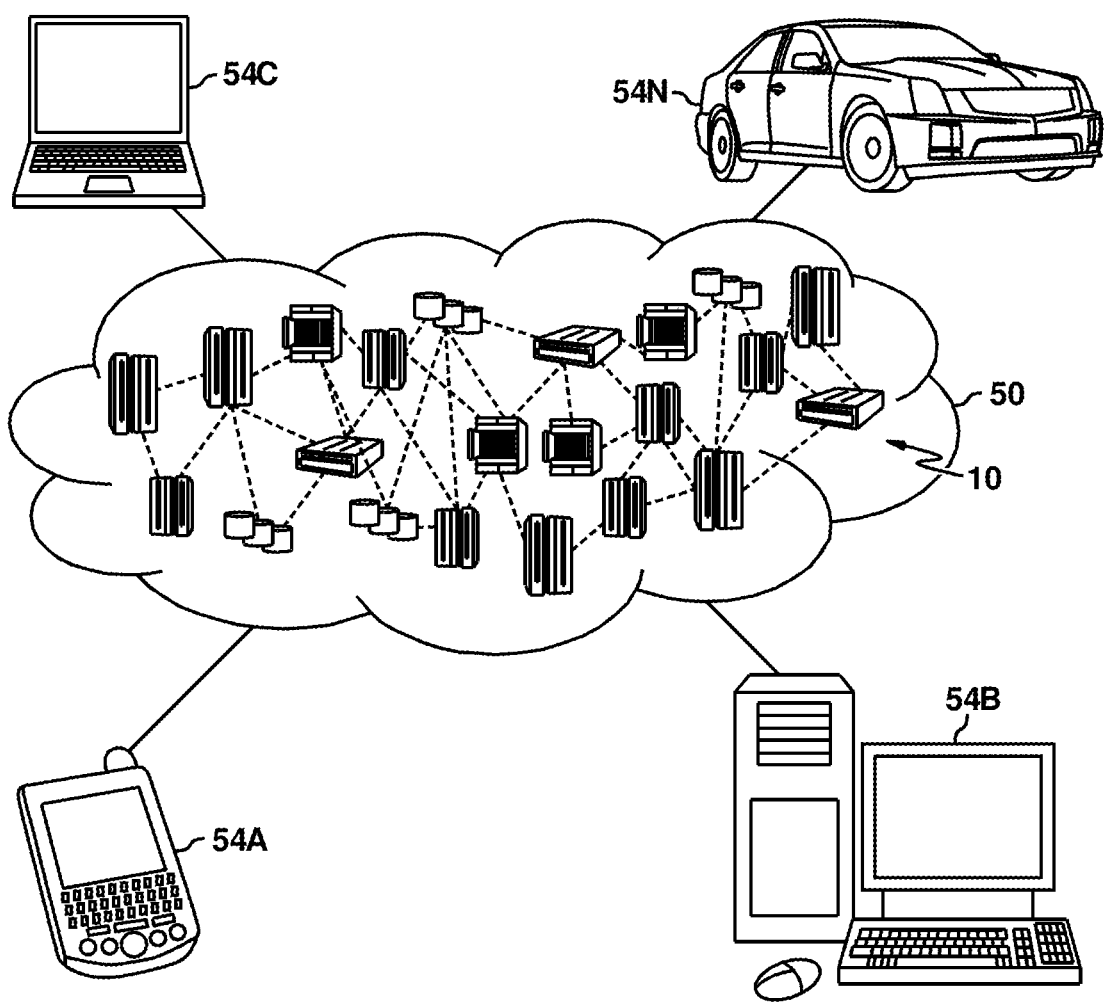
FIG. 8 illustrates a cloud computing environment, in accordance with an embodiment of the invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 9:
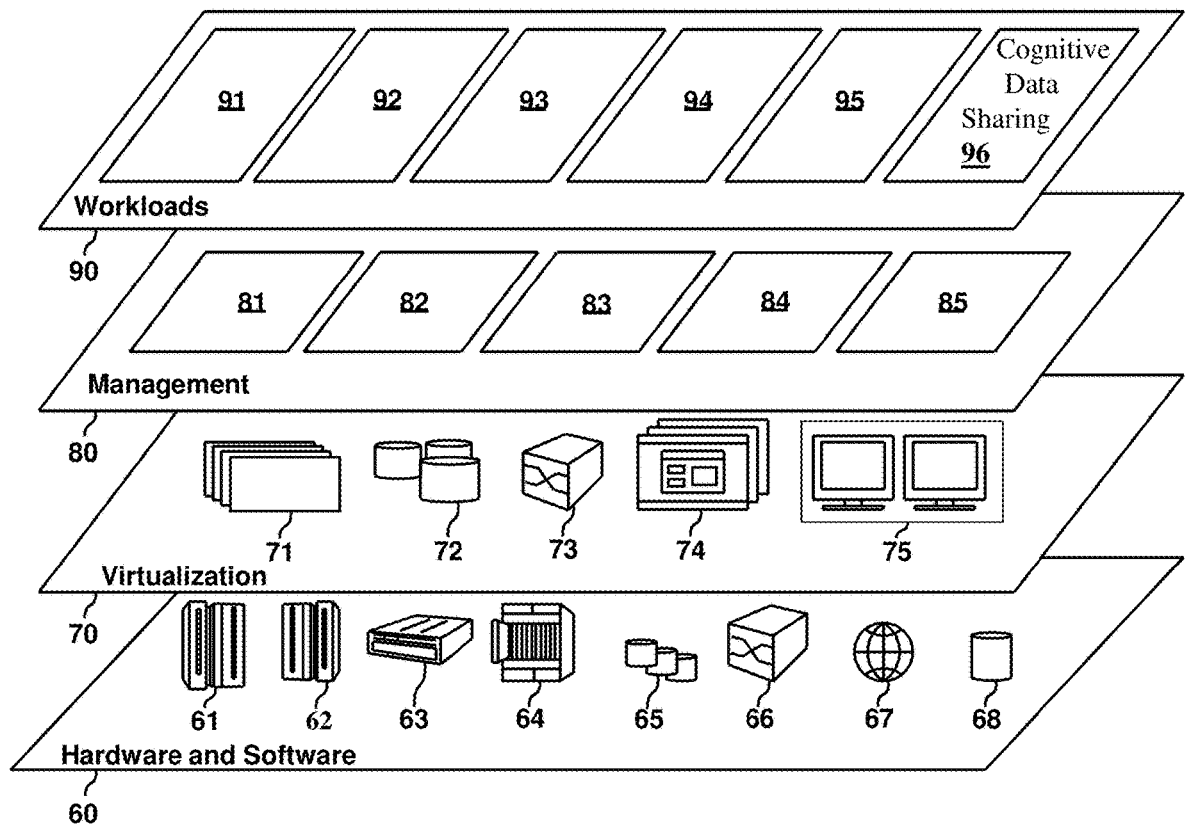
FIG. 9 illustrates a set of functional abstraction layers provided by the cloud computing environment of FIG. 8, in accordance with an embodiment of the invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive data sharing 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for data sharing between multiple computers communicating via a communications network, the method comprising:

identifying contacts of a first user, using a first computing device, from one or more data sharing channels;

creating a contact profile for each of the identified contacts in a universal data sharing panel of the first computing device, each of the contact profiles containing contact information for each of the identified contacts, wherein the contact profile includes at least one or more data sharing channels and one or more computing devices for each of the identified contacts;

assigning, by the universal data sharing panel, a confidentiality to each of the one or more data sharing channels of the contact profile for each of the identified contacts, wherein the confidentiality is assigned according to a set of data sharing rules;

creating, by the universal data sharing panel, one or more single data sharing channels, by aggregating each of the one or more data sharing channels having the same confidentiality for each of the contact profiles;

receiving, by the universal data sharing panel, data to be transmitted to a second user from the first computing device;

detecting, by the universal data sharing panel, a confidentiality of the data to be transmitted to the second user;

determining, by the universal data sharing panel, a single data sharing channel of the second user having the same confidentiality as the confidentiality of the data to be transmitted to the second user;

determining, by the universal data sharing panel, an activity status of the one or more computing devices and the one or more data sharing channels of the single data sharing channel associated with the contact profile of the second user;

transmitting, by the universal data sharing panel, the data to the one or more data sharing channels of the single data sharing channel with an active status; and displaying, by the universal data sharing panel, a notification to the second user, wherein the notification includes the confidentiality of the data received by the second user, wherein the notification includes notice of unopened data received by the second user.

2. The method of claim 1, wherein the notification is displayed on a computing device on the second user and utilizes a color code to convey the confidentiality of the transmitted data.

3. The method of claim 1, wherein the notification displayed to the second user indicates an urgency level of the transmitted data using a color code.

4. The method of claim 1, wherein the notification is displayed on a computing device of the second user and utilizes a color code to convey an identity of the first user.

5. A computer program product for data sharing between multiple computers communicating via a communications network, the computer program product comprising:

a computer-readable storage medium having program instructions embodied therewith, wherein the computer readable storage medium is not a transitory signal per se, the program instructions executable by a computer to cause the computer to perform a method, comprising:

identifying contacts of a first user, using a first computing device, from one or more data sharing channels;

creating a contact profile for each of the identified contacts in a universal data sharing panel on the first computing device, each of the contact profiles containing contact information for each of the identified contacts, wherein the contact profile includes at least the one or more data sharing channels and one or more computing devices for each of the identified contacts;

assigning, by the universal data sharing panel, a confidentiality to each of the one or more data sharing channels of the contact profile for each of the identified contacts, wherein the confidentiality is assigned according to a set of data sharing rules;

creating, by the universal data sharing panel, one or more single data sharing channels, by aggregating each of the one or more data sharing channels having the same confidentiality for each of the contact profiles;

receiving, by the universal data sharing panel, data to be transmitted to a second user from the first computing device;

detecting, by the universal data sharing panel, a confidentiality of the data to be transmitted to the second user;

determining, by the universal data sharing panel, a single data sharing channel of the second user having the same confidentiality as the confidentiality of the data to be transmitted to the second user;

determining, by the universal data sharing panel, an activity status of the one or more computing devices and the one or more data sharing channels of the single data sharing channel associated with the contact profile of the second user;

transmitting, by the universal data sharing panel, the data to the one or more data sharing channels of the single data sharing channel with an active status; and displaying, by the universal data sharing panel, a notification to the second user, wherein the notification indicates the confidentiality of the data received by the second user, wherein the notification includes notice of unopened data received by the second user.

6. The computer program product as in claim 5, wherein the notification is displayed on a computing device of the second user and utilizes a color code to convey the confidentiality of the transmitted data.

7. The computer program product as in claim 5, wherein the notification displayed to the second user indicates an urgency level of the transmitted data using a color code.

8. The computer program product as in claim 5, wherein the notification is displayed on a computing device of the second user and utilizes a color code to convey an identity of the first user.

9. A system for data sharing between multiple computers communicating via a communication network, the system comprising:
a computer system comprising, a processor, a computer readable storage medium, and program instructions stored on the computer readable storage medium being executable by the processor to cause the computer system to:
identifying contacts of a first user, using a first computing device, from one or more data sharing channels;
creating a contact profile for each of the identified contacts in a universal data sharing panel on the first computing device, each of the contact profiles containing contact information for each of the identified contacts, wherein the contact profile includes at least the one or more data sharing channels and one or more computing devices for each of the identified contacts;
assigning, by the universal data sharing panel, a confidentiality to each of the one or more data sharing channels of the contact profile for each of the identified contacts, wherein the confidentiality is assigned according to a set of data sharing rules;
creating, by the universal data sharing panel, one or more single data sharing channels, by aggregating each of the one or more data sharing channels having the same confidentiality for each of the contact profiles;
receiving, by the universal data sharing panel, data to be transmitted to a second user from the first computing device;
detecting, by the universal data sharing panel, a confidentiality of the data to be transmitted to the second user;
determining, by the universal data sharing panel, a single data sharing channel of the second user having the same confidentiality as the confidentiality of the data to be transmitted to the second user;
determining, by the universal data sharing panel, an activity status of the one or more computing devices and the one or more data sharing channels of the single data sharing channel associated with the contact profile of the second user;
transmitting, by the universal data sharing panel, the data to the one or more data sharing channels of the single data sharing channel with an active status; and
displaying, by the universal data sharing panel, a notification to the second user, wherein the notification indicates the confidentiality of the data received by the second user, wherein the notification includes notice of unopened data received by the second user.

10. A computer system as in claim 9, wherein the notification is displayed on a computing device of the second user and utilizes a color code to convey the confidentiality of the transmitted data.

11. A computer system as in claim 9, wherein the notification displayed to the second user indicates an urgency level of the transmitted data using a color code.

12. A computer system as in claim 9, wherein the notification is displayed on a computing device of the second user and utilizes a color code to convey an identity of the first user.

* * * * *